United States Patent [19]

Gray

[11] Patent Number: 5,187,212
[45] Date of Patent: Feb. 16, 1993

[54] FLAME RETARDANT POLYESTER BLENDS

[75] Inventor: Keith N. Gray, Newburgh, Ind.

[73] Assignee: General Electric Company, Pittsfield, Mass.

[21] Appl. No.: 726,493

[22] Filed: Jul. 8, 1991

[51] Int. Cl.$^5$ .......................... C08K 5/15; C08K 5/06; C08F 20/00
[52] U.S. Cl. .................................. 524/114; 524/373; 524/375; 524/601; 523/433; 525/438
[58] Field of Search ................ 524/373, 375, 114, 601

[56] References Cited

U.S. PATENT DOCUMENTS 4,548,964 10/1985 Yoshida et al. ...................... 523/455
4,562,216 12/1985 Kishida et al. ...................... 524/373

FOREIGN PATENT DOCUMENTS 2757557 6/1978 Fed. Rep. of Germany .

*Primary Examiner*—Paul R. Michl
*Assistant Examiner*—Tae H. Yoon
*Attorney, Agent, or Firm*—Andrew C. Hess

[57] ABSTRACT

This invention relates to flame retardant thermoplastic molding compositions, comprising:
  (a) a polyester resin derived from a cyclohexanedimethanol and a carbocyclic dicarboxylic acid or ester;
  (b) a tetra brominated bisphenol-A epoxy oligomer endcapped with epichlorohydrin flame retardant; and
  (c) a reinforcing agent.

The compositions of the present invention have excellent thermal stability and other mechanical properties.

11 Claims, No Drawings

FLAME RETARDANT POLYESTER BLENDS

This invention relates to thermoplastic molding compositions that have improved physical properties. More particularly, the invention pertains to compositions comprising a polyester resin derived from a cyclohexane dimethanol and a carbocylic dicarboxylic acid or ester and a primary flame retardant comprised of brominated epoxides that are preferably prepared by reacting a tetra brominated bisphenol-A with epichlorohydrin to thereby produce a tetra brominated bisphenol-A epoxy oligomer endcapped with a residue of epichlorohydrin. The compositions are preferably modified with a mineral reinforcing agent. The novel blends of present invention have excellent thermal stability and mechanical properties.

BACKGROUND OF THE INVENTION

High molecular weight polyesters and particularly linear polyesters derived from 1,4-cyclohexanedimethanol have been available for a number of years. These are described inter alia in Kilber et al, U.S. Pat. No. 2,901,466. This patent discloses that the polyesters are particularly advantageous as film and fiber-formers. The compositions disclosed herein are also used for injection molding, extrusion and other plastic forming operations.

Recently, it has been suggested to incorporate a brominated epoxy resin as a flame retardant for polybutylene terephthalate molding compositions. A useful brominated epoxy resin is one formed by reacting tetrabromobisphenol-A and epichlorohydrin. This is exemplified in U.S. Pat. No. 3,965,212 wherein tetrabromobisphenol-A, optionally non-brominated bisphenol-A and epichlorohydrin are reacted to form a glycidyl ether-endcapped brominated resin useful as a flame retardant for polybutylene terephthalate. A flame retardant synergist such as antimony trioxide is also added. The epoxy resins which are disclosed in U.S. Pat. No. 3,965,212 however, are of relatively low molecular weight having at most about 11 repeating units of the bisphenol-A-containing ether. Other patents which teach improving the flame resistance of polybutylene terephthalate with the brominated epoxy resins described above together with other brominated aromatic compounds include U.S. Pat. Nos. 3,909,485; 4,548,964; and 4,562,216.

It has been found that many of the aforementioned brominated flame retardants have the drawback that when the same are added to polybutylene terephthalate and the mixture subjected to molding, the resulting molded articles are greatly deteriorated in mechanical properties, particularly toughness.

It has now been unexpectedly discovered that reinforced mixtures of a polyester resin derived from a cyclohexane dimethanol and a carbocylic dicarboxylic acid or ester, and a tetra brominated bisphenol-A epoxy oligomer endcapped with epichlorohydrin as a primary flame retardant unexpectedly exhibit an improvement in certain mechanical properties while showing an improvement in thermal stability.

DETAILED DESCRIPTION OF THE INVENTION

The polyesters utilized in the process of the present invention are derived from cyclohexanedimethanol and are prepared by condensing either the cis- or trans-isomer (or a mixture thereof) of, for example, 1,4-cyclohexanedimethanol with a carbocyclic dicarboxylic acid or ester so as to produce a polyester having recurring units having the following formula I:

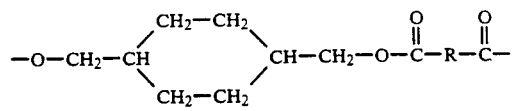

wherein the substituted cyclohexane ring is selected from the group consisting of the cis- and trans-isomers thereof and R represents an organic radical containing from 6 to 20 carbon atoms which is the decarboxylated residue derived from a carbocyclic dicarboxylic acid or ester.

The preferred polyester resins may be derived from the reaction of a mixture of the cis-and trans-isomers of 1,4-cyclohexanedimethanol with a mixture of iso- and terephthalic acids. These polyesters have recurring units of the formula II:

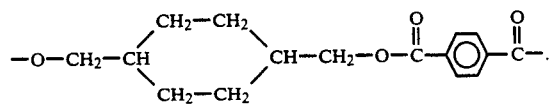

These polyesters can be produced by well known methods in the art such as those set forth in U.S. Pat. No. 2,901,466. The poly (1,4-cyclohexanedimethanol terephthalate) is commercially available. Of course, it is understood that the polyester resins of this invention can be prepared by condensing 1,4-cyclohexanedimethanol and minor amounts of other bifunctional glycols with the carbocyclic dicarboxylic acid. These other bifunctional glycols include the polymethylene glycols containing from 2 to 10 or more carbon atoms such as ethylene glycol, butylene glycol, etc. Preferred polyesters will contain cyclohexane dimethanol units in which the ratio of the trans-/cis-isomer moities is greater than approximately 70%.

The term "carbocyclic" is used herein in its art recognized sense, that is, it refers to any organic compound whose carbon skeleton is in the form of a closed ring. Obviously, not all the atoms in the closed ring have to be carbon, although the term incorporates both aliphatic and aromatic compounds in which all the atoms are carbon. The preferred number of carbon atoms in the carbocyclic functionality employed in the present invention will generally range between 3 and about 15, with the more preferred number of carbon atoms being 6. In the most preferred embodiment of this invention, the carbocyclic dicarboxylic acid or ester is a hexacarbocyclic dicarboxylic acid or ester.

Examples of hexacarbocyclic dicarboxylic acids wherein the carboxy radicals are attached in para relationship to a hexacarbocyclic residue indicated by R in formula (I) include terephthalic acid, transhexahydroterephthalic acid, p,p'-sulfonyldibenzoic acid, 4,4'-diphenic acid, 4,4'-benzophenonedicarboxylic acid, 1,2-di(p-carboxyphenyl)ethane, 1,2-di(p-carboxyphenyl)ethane, 1,2-di(p-carboxyphenoxy)-ethane, 4,4'-dicarboxydiphenyl ether, etc. and mixtures of these. All of these acids contain at least one hexacarbocyclic nucleus. Fused rings can also be present such as in 1,4-, 1,5 or 2,6-napthalenedicarboxylic acid. The hexacarbocyclic dicarboxylic acids are preferably those containing a transcyclohexane nucleus or an aromatic nucleus containing from one to two benzene rings of which at least one has the usual benzenoid unsaturation. Of course, either fused or attached rings can be present. All of the compounds named in this paragraph come within the scope of this preferred group. The preferred dicarboxylic acids is terephthalic acid.

These polyesters, which are alternatively referred to herein as "PCT Resins" should have an intrinsic viscosity between 0.40 and 2.0 dl./g. measured in a 60/40 phenoltetrachloroethane solution or a similar solvent at 25°-30° C. Especially preferred polyesters will have an intrinsic viscosity in the range of 0.5 and 1.2 dl./g.

The primary flame retardant utilized in the present invention is a brominated epoxide, preferably a compound produced by reacting tetrabromo-bisphenol-A with epichlorohydrin, by standard methods well known to those skilled in the art, to thereby form a tetra brominated bisphenol-A epoxy oligomer endcapped with epichlorohydrin. The primary flame retardants utilized in the present invention will have a bromine content of at least 25% by weight and preferably at least about 50% by weight. The molecular weight of the flame retardant will generally range from about 6,000 to about 90,000, and preferably from about 15,000 to about 60,000. One suitable primary flame retardent for use in the present invention will have the formula:

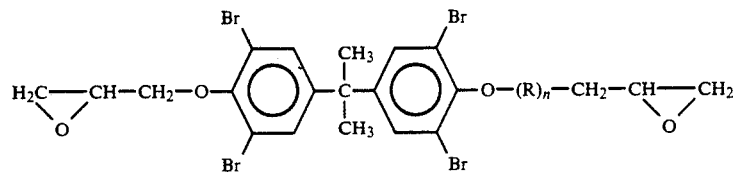

wherein R is

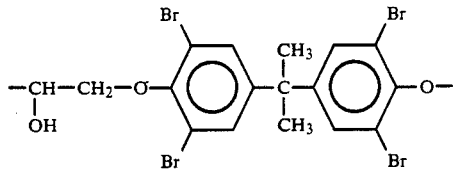

and n is from about 10 to about 150. An example of suitable primary flame retardants are those that are available from M & T Chemicals and sold under the tradename of Thermoguard polymeric flame retardant. Two particularly suitable flame retardants are Thermoguard 230 and Thermoguard 240. Thermoguard 230 has a molecular weight range from about 15,000 to about 25,000, whereas the molecular weight of Thermoguard 240 ranges from about 40,000 to about 60,000.

The composition of the present invention will also include, as a third component of the composition, at least one mineral reinforcing agent, preferably a glass reinforcing agent, most preferably fibrous (filamentous) glass. Suitable mineral reinforcing agents for use in the present invention include fillers such as talc, mica, wollastinite, asbestos, quartz and clay. Other suitable mineral reinforcing agents include fibrous materials such as ceramic filaments, carbon fibers, glass flake and milled glass. The preferred mineral reinforcing agent, filamentous glass, is well known to those skilled in the art and is widely available from a number of manufacturers. For compositions ultimately to be employed for electrical uses, it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastic reinforcements are made by mechanical pulling. The filament diameters range from about 0.00012 to 0.00075 inch, but this is not critical to the present invention. The length of the glass filaments is also not critical to the invention. However, in preparing the molding compositions, it is convenient to use the filamentous glass in the form of chopped strands of from about one-eighth to about two inches long. In articles molded from the compositions, on the other hand, even shorter lengths will be encountered because, during compounding considerable fragmentation will occur. This is desirable, however, because the best properties are exhibited by thermoplastic injection molded articles in which the filament lengths lie between about 0.0005 to 0.250 inch.

It should be understood that the composition obtained according to this invention may contain one or more conventional additives such as, for example, antioxidants, carbon black, plasticizers, rubbery impact modifiers, lubricity promoters, flow promoters, color stabilizers, ultraviolet absorbers, X-ray opacifiers, dyes, pigments, fillers, mold release agents, nuclante and the like. The compositions may also contain minor amounts of secondary flame retardants. Satisfactory thermal, oxidative and/or ultraviolet stabilizers comprise phenols and their derivatives, amines and their derivatives, compounds containing both hydroxyl and amine groups, hydroxyazines, oximes, polymeric phenolic esters and salts of multivalent metals in which the metal is in its lower state.

Representative phenol derivatives useful as stabilizers include 3,5-di-tert-butyl-hydroxy hydrocinnamic triester with 1,3, 5-tris-(2-hydroxyethyl-s-(2,6-ditertiary-butylphenol); 1,3,5-trimethyl-2,4,6-tris-(3,5-ditertiary-butyl-4-hydroxylbenzyl)benzene and 4,4'-butylidene-bis (6-tertiary-butyl-m-cresol). Various inorganic metal salts or hydroxides can be used as well as organic complexes such as nickel dibutyl dithiocarbamate, manganous salicylate and copper 3-phenylsalicylate. Typical amine stabilizers include N,N'-bis(betanaphthyl)-p-phenylenediamine; N,N'-bis(1-methylheptyl)-p-phenylenediamine and either phenyl-beta-napthyl amine or its reaction products with aldehydes. Mixtures of hindered phenols with esters or thiodipropionic, mercaptides and phosphite esters are particularly useful. Additional stabilization to ultraviolet light can be obtained by compounding with various UV absorbers such as substituted benzophenones and/or benzotriazoles. Particularly useful stabilizers are hindered phenols such as phenols of the formula

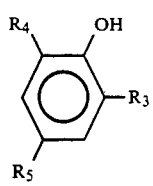

wherein $R_3$ and $R_4$ are hydrocarbon groups having from one to about 20 carbon atoms, and $R_5$ is a hydrogen atom or a hydrocarbon group having from one to about 20 carbon and bisphenol of the formula

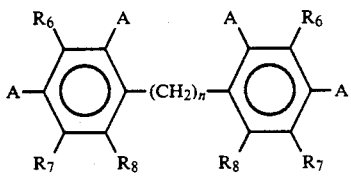

wherein $R_6$, $R_7$ and $R_8$ are each a hydrogen atom or a hydrocarbon group having from one to about 20 carbon atoms, one of the two A's on each ring is a hydroxyl group and the other A on each ring is a hydrogen atom or a hydrocarbon group having from one to about 20 carbon atoms; and n is an integer of from 0 to about 20.

Preferred hindered phenols useful in this invention include 2,6-di-tert-butyl-4-methyl-phenol, commonly known as BHT (sold under the tradename Ionol ® by Shell Chemical Co.); 4,4-methylene bis(2,6-di-tert-butylphenol) and 2,6-di-tert-butyl-4-n-butylphenol (sold under the tradename Ethyl 702 and Ethyl 744, respectively, by Ethyl Corp.); and tetrakis[methylene 3-(3',5'-di-tert-butyl-4'-hydroxyphenyl) proprionate]methane and stearyl-3-(3',5'-di-tertbutyl-4'-hydroxyphenyl) proprionate (sold under the tradenames Irganox 1010 and Irganox 1076, respectively, by Ciba-Geigy).

The compositions of the present invention will preferably contain from about 40% to about 90% by weight, and preferably from about 60% to about 80% by weight of a resin derived from a cyclohexane-dimethanol and a carbocylic dicarboxylic acid and from about 10% to about 60% by weight and preferably from about 20% to about 40% by weight of a reinforcing agent, said weight percentages being based on the total weight of the polyester resin and the reinforcing agent. The amount of the tetra brominated bisphenol-A epoxy oligomer endcapped with epichlorohydrin flame retardant utilized will be in an amount sufficient to flame retard the reinforced polyester composition of the present invention. Generally, such amount will be at least 8% add-on, and most preferably about 10% add-on based on 100 parts by weight of the reinforced polyester resin. Generally, the amount of flame retardant utilized should not exceed more than 60wt % add-on of the total of the reinforced polyester resin and preferably an amount of about 50 wt % add-on of flame retardant should not be exceeded. Generally, if the compositions contained less than about 8 wt % add-on of the flame retardant compound there is no significant improvement in the flame retardancy of the polyester resin. Amounts of flame retardant in excess of about 60 wt % add-on do not appreciably increase or improve the flame retardancy of the polyester resin.

It is understood that the instant composition may contain only one primary flame retardant compound of the present invention, or the composition may contain a mixture of two or more different primary flame retardant compounds according to the present invention. Furthermore, the amount of flame retardant compound used is dependent upon the particular primary flame retardant compound used and upon the particular polyester resin utilized.

Finally, the flame retardant mixture may also optionally contain an effective amount of a drip inhibitor. This amount would generally be from about 0.01 to about 5 parts by weight, preferably from about 0.05 to about 2.0 plus by weight, based on 100 parts of the total composition. Suitable non-dripping agents are well known and widely available. They include the fumed and colloidal silicas and polytetrafluoroethylene resins. Especially preferred are the polytetrafluoroethylene resins, most preferably TEFLON ®6 from E. R. DuPont.

The components of the composition of the present invention can be intimately blended in a number of procedures. In one way, the various additives to the polyester resin are put into an extrusion compounder with the dry polyester resin and the blend is heated at an elevated temperature, e.g., 560°-600° F., and extruded to produce molding pellets. The additives are mixed with the powdered or granular polyester and the mixture can be heated and directly formed into blow molded items using machines which compound and mold.

DESCRIPTION OF THE PREFERRED EMBODIMENT

The following examples are presented to more fully and clearly illustrate the present invention. They are presented as illustrative of the invention and are not to be construed as limiting the invention thereto. In the examples all parts and percentages are on a weight basis unless otherwise specified.

Examples 1 and 4 are compositions falling outside the scope of the instant invention in that they do not contain the primary flame retardant of the present invention, but contain other prior art flame retardants. These examples are presented for comparative purposes only. In all the examples, the compositions were prepared by melt blending the specified polyester resins and the indicated additional components as set forth in Table I below using a 2.5 inch single screw extruder at appx. 570° F. The resulting polymeric composition was formed, by injection molding, into test specimens of the size described in the corresponding ASTM methods. The notched izod and other properties of the compositions were tested with the results of these tests set forth in Table II below.

The following ASTM methods were used in determining the physical characteristics of the compositions:

| | |
|---|---|
| Flexural Strength | ASTM D790 |
| Tensile Property | ASTM D638 |
| Izod Impact Strength | ASTM D256 |
| Shrinkage | ASTM D955 |

Flammability tests were performed following the procedure of Underwriter's Laboratory Bulletin 94 entitled "Tests for Flammability of Plastic Materials, UL94". According to this procedure, the materials were classified as either UL94 HB, UL94 V-0, UL94 V-I or UL94 V-II on the basis of the test results obtained for five samples. The criteria for each of these flammability classifications according to UL94, are, briefly, as follows:

HB: In a 5 inch sample, placed so that the long axis of the sample is horizontal to the flame, the rate of burn of the sample is less than 3 inches per minute, and the flames should be extinguished before 4 inches of sample are burned.

V-0: In a sample placed so that its long axis is 90° to the flame, the average period of flaming and/or smoldering after removing the igniting flame should not exceed five seconds and none of the vertically placed samples should produce drips of particles which ignite absorbent cotton.

V-I: In a sample placed so that its long axis is 90° to the flame, the average period of flaming and/or smoldering after removing the igniting flame should not exceed twenty-five seconds and none of the vertically placed samples should produce drips of particles which ignite absorbent cotton.

V-II: In a sample placed so that its long axis is 90° to the flame, the average period of flaming and/or smoldering after removing the igniting flame should not exceed twenty-five seconds and the vertically placed samples produce drips of burning particles which ignite cotton.

EXAMPLE 1

A composition was prepared consisting of the weight percents as indicated in TABLE 1. The resulting polymeric composition was formed, by injection molding, into test bars measuring 2.5 inches × ½ inches × ¾ inch. A number of tests were taken of the physical properties of the composition according to the ASTM standards noted above and the test procedure set forth in Underwriters Laboratories UL94 Bulletin, and the results are set forth in Table II below.

EXAMPLES 2-3

Examples 2-3 utilize the components of Example 1 with the exception that primary flame retardants of the present invention were utilized in place of the primary flame retardants utilized in Examples 1 and 4. The compositions of these Examples, which are formulated as per TABLE I, were molded into test bars of the same dimensions as in Example 1. These test bars were subjected to the UL-94 test and the results are set forth in TABLE II. Furthermore, these bars were tested for various physical properties, the results of which tests are also set forth in Table 11. All parts in TABLE I are listed in terms of percent by weight.

TABLE 1

| | EXAMPLE NO. | | | |
|---|---|---|---|---|
| | 1 | 2 | 3 | 4 |
| PCT | 46.5 | 48.4 | 48.4 | 48.4 |
| Glass Fiber | 30.0 | 30.0 | 30.0 | 30.0 |
| Brominated Polystryrene | 12.5 | — | — | — |
| Brominated Polycarbonate Oligomer | — | — | — | 11.5 |
| FR/EVA | 4.5 | 3.6 | 3.6 | 3.6 |
| EVA | 2.0 | 2.0 | 2.0 | 2.0 |
| Talc | 2.0 | 2.0 | 2.0 | 2.0 |
| Thermoguard 230 | — | 11.5 | — | — |
| Thermoguard 240 | — | — | 11.5 | — |

TABLE 1-continued

| | EXAMPLE NO. | | | |
|---|---|---|---|---|
| | 1 | 2 | 3 | 4 |
| Stabilizer | 2.5 | 2.5 | 2.5 | 2.5 |

FR/EVA is a sodium antimonate/ethylene vinyl acetate concentrate that is utilized as a secondary flame retardant.
EVA is a ethylene vinyl acetate copolymer that is utilized as a flow promoter.

TABLE 2

| PROPERTIES | | | | |
|---|---|---|---|---|
| | EXAMPLE NO. | | | |
| | 1 | 2 | 3 | 4 |
| Melt Viscosity (poise) | 8,311 | 4,538 | 5,575 | 5,407 |
| Monsanto Viscosity (poise) | | | | |
| T5 | 1,846 | 2,653 | 2,823 | 1,374 |
| T10 | 785 | 1,719 | 1,537 | 81 |
| Notched Izod Imact (ft. lbs./in.) | 1.058 | 1.298 | 1.213 | 1.185 |
| Unnotched Izod Impact (ft. lbs./in.) | 13.544 | 16.317 | 15.416 | 14.428 |
| Tensile Elongation (%) | 8.861 | 9.543 | 9.932 | 8.673 |
| Tensile Strength (psi) | 17.91K | 18.05K | 18.91K | 17.37K |
| Flexural Strength (psi) | 24.32K | 27.72K | 27.54K | 26.18K |
| Flammability (initial) | V-0 | V-0 | V-0 | V-0 |
| Flammability (Aged one week at 70° C.) | V-0 | V-0 | V-0 | V-0 |
| Spiral Flow (inches) | 7.6 | 8.9 | 8.4 | 6.6 |

Tensile elongation was measured by cross-head displacement on 2.5×0.5 inch Type 5 tensile bars. Spiral flow was measured at 90 mil channel thickness for the spiral flow and a melt temperature of 305° C.

PCT stands for poly(1,4-cyclohexane dimethanol), which is sold under the trademark Eastman 3879 from Eastman Kodak Company.

The above data illustrates the advantages, in terms of improvements realized in certain physical properties, of the flame retardant composition of the present invention when comparing such properties with those realized in similar polyester materials that are rendered flame retardant through the use of brominated polystyrene or tetra brominated bisphenol-A oligomers endcapped with phenol. For example, the decrease in the value of melt viscosity indicates that the composition of the present invention possesses better processability than the flame retardant polyesters of Examples 1 and 4. In addition, improvements were realized in other physical properties as per the increased values for the notched and unnotched izod impact values, the tensile elongation and strength values, the flexural strength and the spiral flow, without a sacrifice in flame retardancy. Such improvement is clearly unexpected.

Obviously, other modifications and variations of the present invention are possible in light of the above teachings. It is therefore to be understood that changes may be made in the particular embodiments of the invention described which are within the full intended scope of the invention as defined by the appended claims.

What is claimed is:

1. A flame retardant thermoplastic composition comprising:
   (a) a polyester resin derived from a cyclohexanedimethanol and a carbocyclic dicarboxylic acid or ester that has repeating units of the formula:

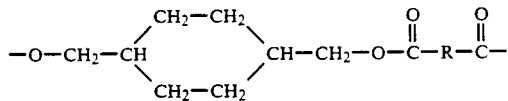

wherein the substituted cyclohexane ring is selected from the group consisting of the cis- and trans- isomers thereof and R represents an organic radical containing from 6 to 20 carbon atoms which is the decarboxylated residue derived from a hexacarboxylic dicarboxylic acid;
(b) a glass fiber reinforcing agent; and
(c) an effective flame retardant amount of a tetra brominated bisphenol-A epoxy eligomer end-capped with epichlorohydrin flame retardant, said flame retardant having a molecular weight range of from about 15,000 to 60,000 and a bromine content of at least 50 percent by weight, and wherein component (a) comprises from about 40% to about 90% by weight of components (a) and (b).

2. The composition of claim 1 wherein component (a) comprises from about 60% to about 80% by weight of the total of components (a) and (b).

3. The composition of claim 1 wherein component (c) comprises from about 10 parts to about 60 parts by weight add-on based on 100 weight parts of the total of components (a) and (b).

4. The composition of claim 3 wherein component (c) comprises from about 15 parts to about 50 parts by weight add-on based on 100 parts by weight of the total of components (a) and (b).

5. A composition as defined in claim 1 herein the carbocyclic acid is a hexacarbocyclic acid.

6. A composition as defined in claim 1 wherein component (a) has the repeating unit:

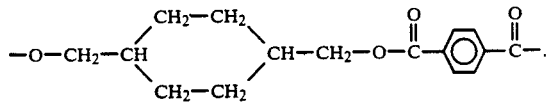

7. The composition of claim 1 wherein the mineral reinforcing agent is a glass reinforcing agent.

8. The composition of claim 7 wherein the glass reinforcing agent is glass fibers.

9. The composition of claim 1 wherein component (c) has a molecular weight range from about 15,000 to about 25,000.

10. The composition of claim 1 wherein component (c) has a molecular weight range froma bout 20,000 to about 60,000.

11. The composition of claim 1 which further comprises an effective amount of a drip inhibitor.

* * * * *